Patented Dec. 27, 1927.

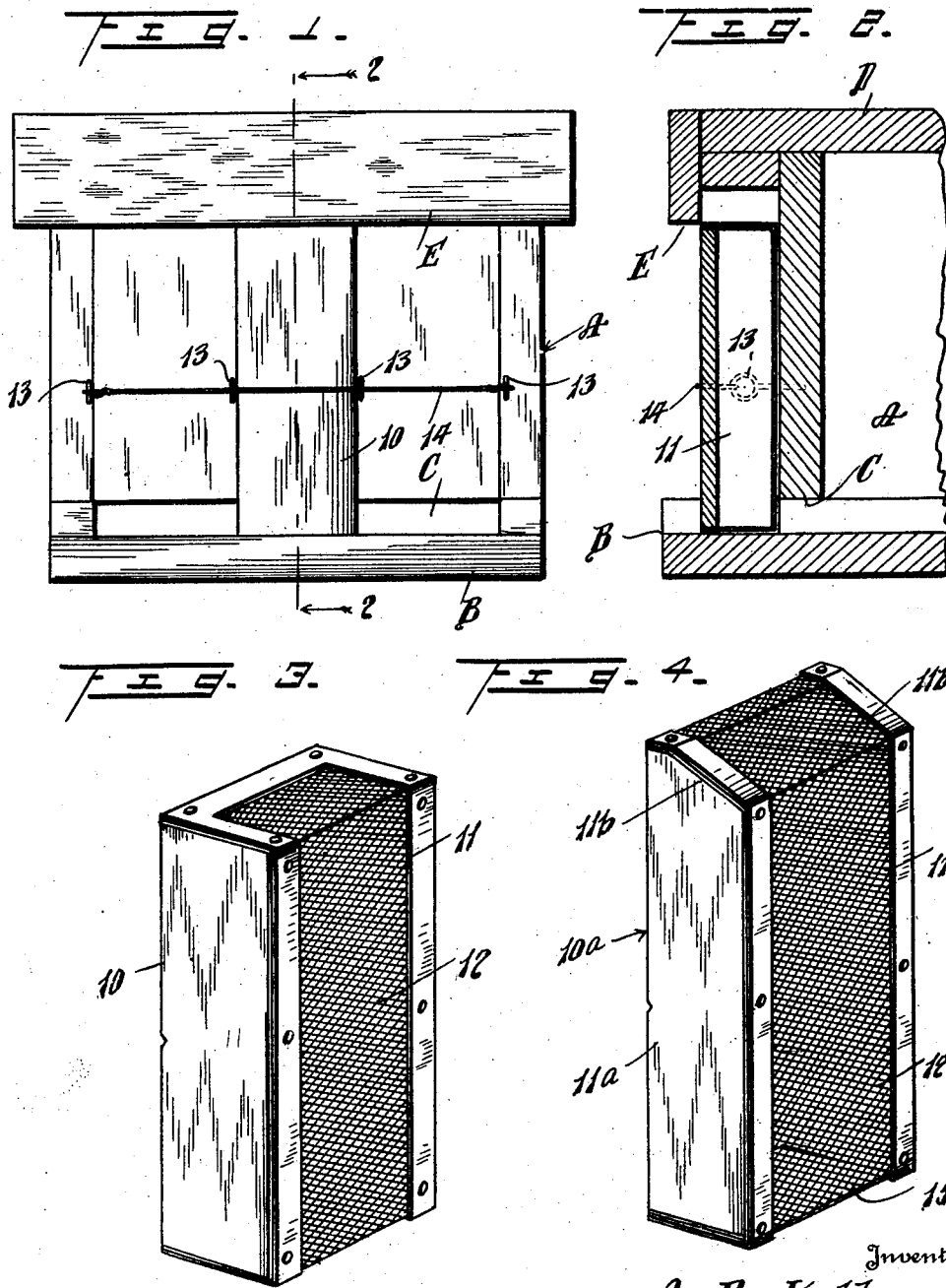

1,654,464

UNITED STATES PATENT OFFICE.

ALBERTA RUTH KELLY, OF ASPEN, COLORADO.

VENTILATOR FOR BEEHIVES.

Application filed March 3, 1927. Serial No. 172,390.

The invention relates to means for ventilating beehives in the winter time.

In the winter when the snow falls the entrance to a beehive may be completely closed with the snow. At this time the weather is usually soft and warmer, as it is usually during a snow storm, and under such conditions the bees need more air. As long as the snow remains fresh and light the air will get through the snow into the beehive and the bees do not seem to suffer for want of air, but the heat of the bees within the hive, the entrance being closed, causes the hive to sweat inside, that is, a discharge of vapor on the walls and frames and combs, so that quite often the water may run down the walls and over the floor of the hive out through the entrance so the snow will be wet and settle and a freeze will in time completely close the entrance to the hive.

The sweaty condition referred to causes the honey to become sour and at other times granulates the honey into solid sugar thus cutting off the supply of nutriment to the bees. The sweaty condition also causes mold and mildew in the interior of the hive and also causes a moldy condition of the combs and pollen that has been stored by the bees in summer to feed to the early brood in the following spring thus possibly causing the dreaded and devastating disease known among bee-keepers as foul brood.

In addition to the water from the interior of the hives escaping through the entrance and softening the snow, the warmer weather will also melt the snow and it settles down and even though it does not freeze will prevent the entrance of fresh air into the hive and unless the snow and slush and ice is removed from the entrance to the hive the bees will smother and die.

Furthermore, when the entrance is opened the bees will rush out for fresh air or because of being disturbed and many of them fall on the snow and sink into it and die unable to rise, this and the other conditions weakening the colony badly if storms are frequent.

This invention has for its object the provision of means by which the interior of the hive may be ventilated, permitting the entrance of fresh air to supply the bees with the air, and at the same time permit the escape of vapor or moisture laden air and thus prevent sweating of the interior of the hive as heretofore described, and also making it unnecessary for the bees to rush out of the hives when the entrance is opened and thereby saving the colony from decimation and preventing the honey and pollen from becoming moldy and unfit for consumption by the bees, and the early brood in the spring.

The invention will be described in detail hereinafter and will be found illustrated in the accompanying drawings, in which Figure 1 is a front view in elevation of a beehive showing one of the improved ventilators in position, Figure 2 is a fragmental sectional view on a plane indicated by the line 2—2 of Figure 1, Figure 3 is a perspective view of the form of ventilator shown in Figures 1 and 2, and Figure 4 is a similar view of a modified form.

In the drawings similar reference characters will be used to designate corresponding parts throughout the several views.

The improved ventilator is shown in use on a beehive designated A having a landing B, leading to an entrance C, and having a removal cover or top D that overhangs the landing B and entrance C as shown at E.

The ventilator comprises a channel-shaped member 10 having its laterally projecting flanges 11 covered with a wire screen fabric 12, said fabric being secured to the ends of the member 10 and extended along the outer edges of the flanges 11. The member 10 may be secured in position by any suitable means. In the drawings the means for securing the member 10 comprising the ventilator in position consists of screw eyes 13 engaging the front wall of the beehive A and securing through the screw eyes a piece of flexible material such as wire or cord 14. By seating one end of the ventilator on the landing B with the open side, covered with the wire screen, engaging the outer surface of the wall, it will be apparent that air may enter through the upper end of the channel member 10 and enter the hive through the entrance C at the lower end of the channel member. Furthermore the channel member 10 is made of sufficient length that its upper end will be protected by the overhang D and the usual flange E on the edge of said overhang so that it will be impossible for snow or rain water to enter the hive through the ventilator or for the ventilator to become clogged by snow or ice.

In Figure 4 is shown a modified form of ventilator in which the flanges 11ª of the channel member 10ª have one of their ends cut away on inclined planes as shown at 11ᵇ, this end of the form shown in Figure 4 being used for the top portion of the ventilator, and is further designed to prevent snow or ice entering the hive through the ventilator. In this form is also provided a closure plate 15 between the screen fabric 12ª and the lower end of the channel member 10ª.

The manner of use of the ventilator will be apparent from the drawings and the above description and a further description of the operation of the device is considered to be unnecessary. In experimenting with the ventilator it has been found that as the bees have plenty of fresh air through the ventilators, they do not rush out of the hive when the entrance is opened by clearing it of snow and ice as in the case where no ventilators are used, and furthermore it is unnecessary to open the hives until the weather has moderated and the snow settled so that the bees will not sink into the snow if they do come out of the hive, and it has been found that the colonies in hives on which the ventilator has been used have come out in the spring with more bees, have swarmed earlier, and made more honey.

A further use of the ventilator is to prevent bees from robbing one another's hives. This occurs in the spring before there is any honey to be made and in the fall after the frost has killed the honey producing flowers. It is at this time that the bees seeking for something to do try to rob one another's hives. This causes loss of bees because of the shrinkage in the supply of food in the hives robbed, and also in the bees that are killed in the struggle to prevent the robbery. With this ventilator the hive may be entirely closed if desired and the bees prevented from egress from the hive and ingress to the hive that is being robbed, the ventilators of course being attached after nightfall when the bees have settled.

What is claimed is:—

A ventilator for beehives, comprising a channeled member having the channel closed at one end, the side walls of the member at the other end being cut away on inclined lines, the open side and end of the channeled member being covered with screen material, said member being adapted to seat on the landing of a beehive and to be secured against the entrance with an open end of the channel member uppermost and the screen material against the front wall of the hive.

In testimony whereof I affix my signature.

ALBERTA RUTH KELLY.